April 7, 1953   F. J. KOHOUT   2,633,616
SPLIT RING CLAMP FOR METAL DRUMS
Filed Oct. 20, 1949
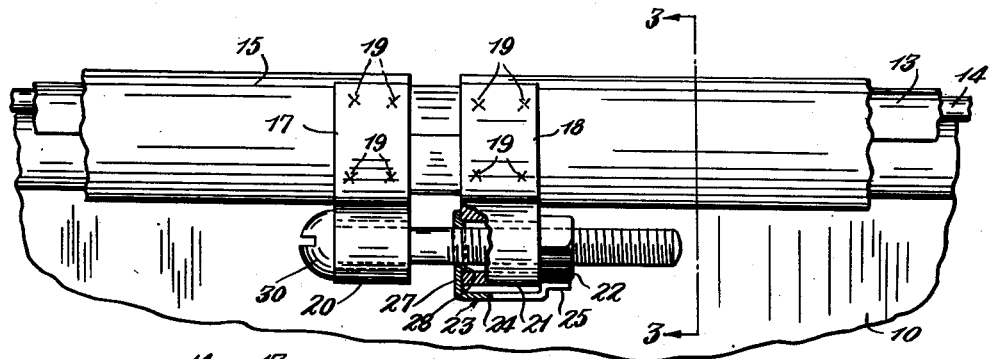
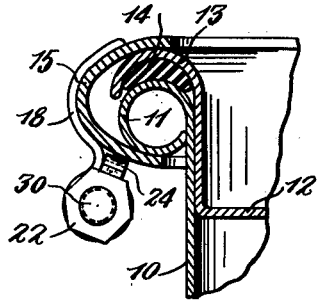
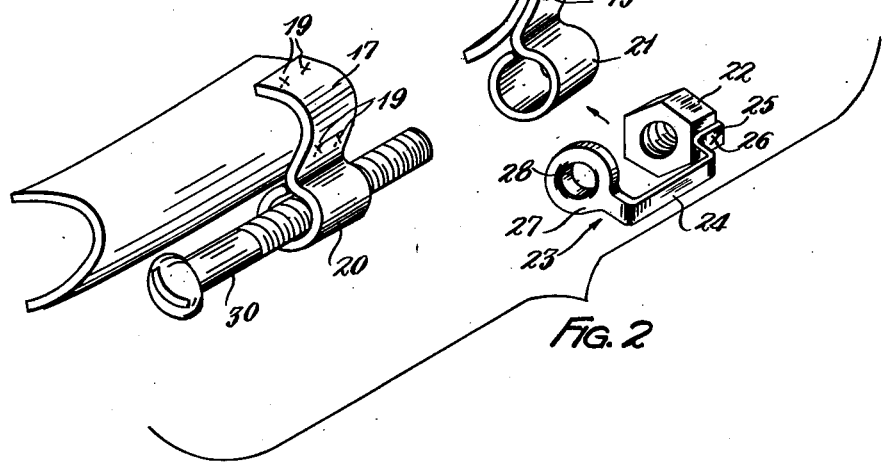
INVENTOR:
FRANK J. KOHOUT
BY Hudson, Boughton,
Williams, David & Hoffmann.
ATTORNEYS Patented Apr. 7, 1953

2,633,616

UNITED STATES PATENT OFFICE 2,633,616

SPLIT RING CLAMP FOR METAL DRUMS

Frank James Kohout, Cleveland, Ohio, assignor to Drum Parts, Inc., Cleveland, Ohio, a corporation of Ohio Application October 20, 1949, Serial No. 122,371

2 Claims. (Cl. 24—68)

This invention relates to improvements in clamping rings for metal drums, and has reference particularly to rings of the type that are contracted into drum sealing condition by means of a bolt and nut carried respectively by the ends of the ring on opposite sides of its split.

One of the objects of the invention is the provision of simple and effective means for holding the nut in the desired position, so that both of the operator's hands may be free for manipulation of the ring and bolt.

Another object is the provision of a nut holder of such character that the nut and holder may be removed and replaced quickly and without the use of tools.

Other objects and features of novelty will appear as I proceed with the description of that embodiment of the invention which, for the purposes of the present application, I have illustrated in the accompanying drawing, in which:

Fig. 1 is a fragmental elevational view of a metal container of the type in which the lid is sealed in place by a clamping ring, and embodying the present invention.

Fig. 2 is a fragmental perspective view of the ring parts showing the nut holder about to be snapped into place on one end of the ring, and Fig. 3 is a transverse sectional view taken substantially on the line 3—3 of Fig. 1.

In the drawing a metal drum or other cylindrical container is shown fragmentally at 10. Its upper edge is rolled to provide the conventional bead 11. This open end of the container is closed in the usual manner by an inset lid 12 having a curved outwardly extending flange 13 in which is mounted a soft rubber gasket 14 by means of which the joint between the container and the lid is sealed when the flange 13 is pulled down tightly. Downward pressure is exerted on the flange 13 by means of a split clamping ring 15 of C shape in cross section, bearing on the top of flange 13 and the bottom of bead 11. When the ring is contracted it exerts a camming action which applies force to compress the gasket 14 and seal the joint.

Contraction of the ring is effected by means of a bolt and nut which may be operated to pull the ends of the ring toward each other. At the ends of the ring on either side of the split I mount lugs 17 and 18 of heavy gauge sheet metal, the upper portions of these lugs being curved to conform to the external surface of the ring, to which they may be joined by spot welds indicated at 19. The lower portions of these lugs are rolled to form cylindrical loops 20 and 21 which are disposed in alignment when the ring is in place.

A nut 22 is positioned at the end of loop 21 which is remote from loop 20. It is held in the desired position by a nut holder 23 which comprises a narrow strip 24 of spring metal that is secured to the nut 22 by suitable means. Preferably the extremity of the strip 24 is offset slightly to provide a foot 25 that is attached to one facet of the nut by a spot weld 26.

The strip 24 beyond the offset foot 25 extends lengthwise of the loop a distance substantially equal to the length of the loop, and at that point has an integral laterally extending portion 27 which is perforated in alignment with the threaded hole through nut 22. The metal around the perforation is flared toward the nut to provide a narrow flange 28 of a size to fit within the bore of loop 21.

The length of the longitudinal portion of narrow strip 24 is such that when the holder and attached nut are pushed into place the spring metal of the holder yields sufficiently to enable the flange 28 to ride over the end surface of loop 21 and then to snap into position within the loop. The nut 22 is thereby held in place against accidental movement either longitudinally or transversely of the loop. The holder along with the nut may turn however around the axis of the loop.

With the ring 15 in place on a container and the nut holder 23 in operative position upon the loop 21, a bolt 30 may be projected through loop 20, through the opening in the laterally extending portion 27 of the nut holder and through the loop 21 into threaded engagement with the nut. When the threads on the end of bolt 30 have entered the threaded hole in the nut a short distance, further rotational force applied to the bolt will be transmitted to the nut, and the nut and nut holder will turn until the narrow strip 24 engages the lug 18 above the loop as indicated in Fig. 3, whereupon no further rotation of the nut by the bolt is possible and continued rotational force applied to the bolt will cause it to be threaded into the nut until the contraction of the ring has progressed far enough to compress the gasket 14 to the desired extent. When it is desired to open the container and the bolt 30 is backed off accordingly, the nut and nut holder may revolve from the Fig. 3 position through nearly a complete turn until the strip 24 engages the front side of the lug 18 after which it cannot turn further in that direction and the bolt may be unthreaded from the nut.

In the event that the thread of the nut becomes damaged it is the work of but an instant to pull off that nut with its holder and put on a new one. Also a nut of one size with its holder may be withdrawn and a different sized nut with its holder may be substituted, thereby accommodating bolts of different sizes.

Having thus described my invention, I claim:

1. A split ring clamp for closing and sealing sheet metal containers, comprising two lugs rigid with said ring, one on each side of its split, said lugs having integral parts rolled into first and second cylindrical loops, each of said loops being spaced from the ring by an intermediate connecting portion of the lug, a nut disposed adjacent to and axial with said second loop, a nut holder attached at one end to said nut, said holder comprising a narrow strip closely parallel with the second loop and extending along the loop exteriorly thereof, the opposite end of said holder having a laterally extending portion provided with a hole registering with the space surrounded by said second loop, and a bolt projected through said first loop, through the hole in said laterally extending portion, through said second loop and threaded into said nut, whereby the rotation of said bolt may cause said nut to turn through a major part of a revolution until the longitudinal portion of said holder bears edgewise against said intermediate connecting portion of the lug, after which further rotation of the bolt will cause it to turn relative to said nut.

2. A split ring clamp as defined in claim 1, wherein said nut holder is resilient and said laterally extending portion of said holder has a flared flange surrounding said hole, said flared flange being adapted to be sprung into or out of operative relation with said second loop with its flared flange engaging the inner wall of said second loop.

FRANK JAMES KOHOUT.

REFERENCES CITED

The following references are of record in the file of this patent:

UNITED STATES PATENTS

| Number | Name | Date |
|---|---|---|
| 2,159,573 | Tinnerman | May 23, 1939 |
| 2,274,014 | Tinnerman | Feb. 24, 1942 |
| 2,486,565 | Kojan et al. | Nov. 1, 1949 |

FOREIGN PATENTS

| Number | Country | Date |
|---|---|---|
| 291,597 | Germany | April 28, 1916 |